United States Patent
Woldemar et al.

(10) Patent No.: US 9,482,276 B2
(45) Date of Patent: Nov. 1, 2016

(54) METHOD OF FILLING LUBRICATING FLUID IN HARD DISK DRIVES

(71) Applicant: SEAGATE TECHNOLOGY LLC, Cupertino, CA (US)

(72) Inventors: Chris M. Woldemar, Santa Cruz, CA (US); Hans L. Leuthold, Santa Cruz, CA (US)

(73) Assignee: Seagate Technology, LLC, Cupertino, CA (US)

( * ) Notice: Subject to any disclaimer, the term of this patent is extended or adjusted under 35 U.S.C. 154(b) by 49 days.

(21) Appl. No.: 14/164,109

(22) Filed: Jan. 24, 2014

(65) Prior Publication Data

US 2015/0211576 A1    Jul. 30, 2015

(51) Int. Cl.
| | | |
|---|---|---|
| F16C 33/10 | (2006.01) | |
| F16C 43/02 | (2006.01) | |
| F16C 17/10 | (2006.01) | |
| G11B 19/20 | (2006.01) | |

(52) U.S. Cl.
CPC ......... *F16C 33/1045* (2013.01); *F16C 17/107* (2013.01); *F16C 33/103* (2013.01); *F16C 33/1085* (2013.01); *F16C 43/02* (2013.01); *G11B 19/2036* (2013.01); *F16C 2370/12* (2013.01); *Y10T 29/49639* (2015.01); *Y10T 29/49645* (2015.01); *Y10T 29/49702* (2015.01)

(58) Field of Classification Search
CPC   F16C 33/1045; F16C 17/107; F16C 33/103; F16C 33/1085; F16C 43/02; G11B 19/2036; Y10T 29/49639; Y10T 29/49702; Y10T 29/49645

See application file for complete search history.

(56) References Cited

U.S. PATENT DOCUMENTS

| | | | | |
|---|---|---|---|---|
| 5,778,948 | A * | 7/1998 | Gomyo | F16C 33/103 141/5 |
| 6,034,454 | A * | 3/2000 | Ichiyama | F16C 17/107 310/90 |
| 6,694,617 | B2 * | 2/2004 | Gredinberg | F16C 17/045 141/5 |
| 7,056,024 | B2 | 6/2006 | Weingord et al. | |
| 7,365,940 | B2 * | 4/2008 | Yamamoto | F16C 17/107 310/90 |
| 7,825,557 | B2 | 11/2010 | Drautz et al. | |
| 8,277,125 | B2 | 10/2012 | Kimura et al. | |
| 8,337,086 | B2 | 12/2012 | Oe et al. | |
| 8,467,145 | B1 | 6/2013 | Shin et al. | |
| 2008/0137229 | A1 | 6/2008 | Nakamura et al. | |
| 2010/0132197 | A1 * | 6/2010 | Hori | F16C 17/10 29/898.02 |
| 2012/0183243 | A1 | 7/2012 | Sugiki | |
| 2013/0033137 | A1 | 2/2013 | Yu | |
| 2013/0099613 | A1 | 4/2013 | Cheong et al. | |
| 2013/0147308 | A1 | 6/2013 | Yu | |
| 2013/0154417 | A1 | 6/2013 | Han | |
| 2013/0243356 | A1 | 9/2013 | Yamada et al. | |
| 2013/0321951 | A1 | 12/2013 | Sumiji et al. | |

* cited by examiner

*Primary Examiner* — Sarang Afzali

(57) ABSTRACT

Provided herein is an apparatus, comprising a stationary component comprising a cup having a volume reserved for receiving a predetermined amount of lubricating fluid; a rotatable component comprising a sleeve, wherein the rotatable component is fitted within the stationary component in a position substantially above the volume; and an annular member configured for forming a thrust bearing with the sleeve.

15 Claims, 8 Drawing Sheets

METHOD OF FILLING LUBRICATING FLUID IN HARD DISK DRIVES

BACKGROUND

Hard disk drives ("HDDs") may have exacting height constraints that limit the axial space in designs including fluid dynamic bearing ("FDB") motors. The limited axial space in such designs may provide FDB motors with insufficient journal bearing span, leading to reduced angular stiffness. Larger diameter thrust bearings may increase angular stiffness in cases where it is difficult to increase journal bearing span. However, larger diameter thrust bearings consume more power, leading to less power efficiency.

SUMMARY

Provided herein is an apparatus, comprising a stationary component comprising a cup having a volume reserved for receiving a predetermined amount of lubricating fluid; a rotatable component comprising a sleeve, wherein the rotatable component is fitted within the stationary component in a position substantially above the volume; and an annular member configured for forming a thrust bearing with the sleeve.

These and other features and aspects may be better understood with reference to the following drawings, description, and appended claims.

DRAWINGS

Figure 1A:
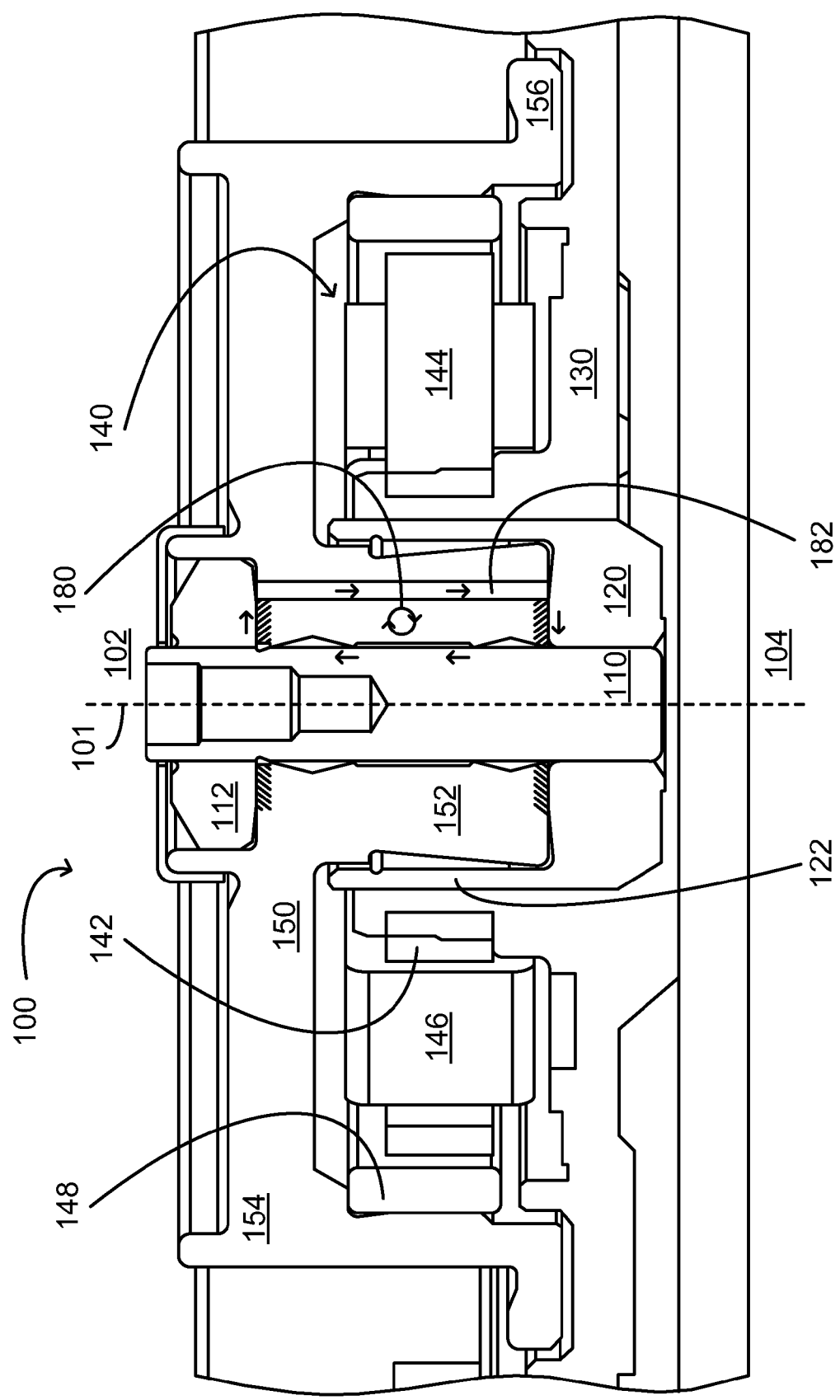

FIG. 1A provides a cross-sectional view of an FDB motor in accordance with an embodiment.

Figure 1B:
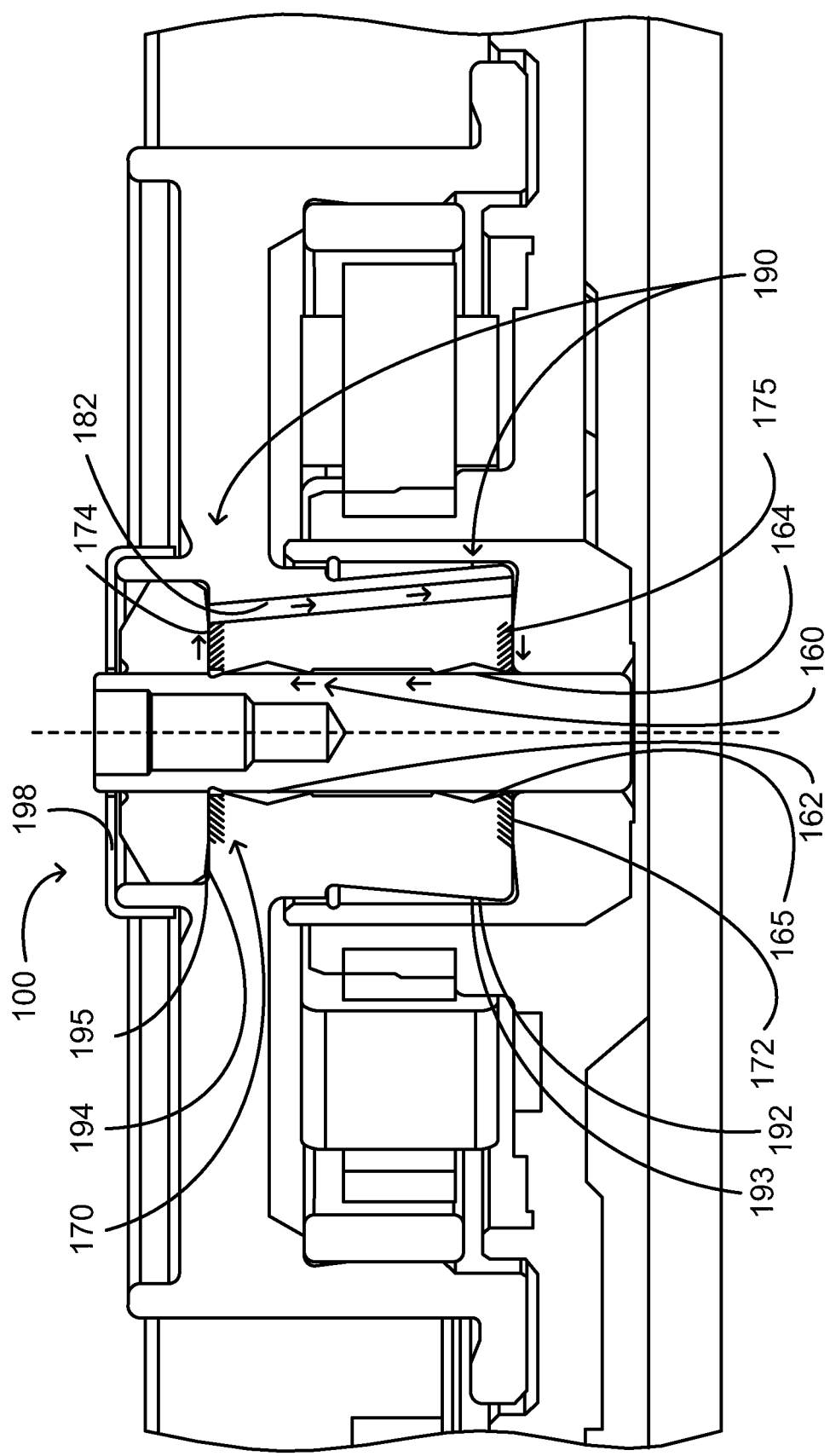

FIG. 1B provides a cross-sectional view of an FDB motor in accordance with an embodiment.

Figure 2:
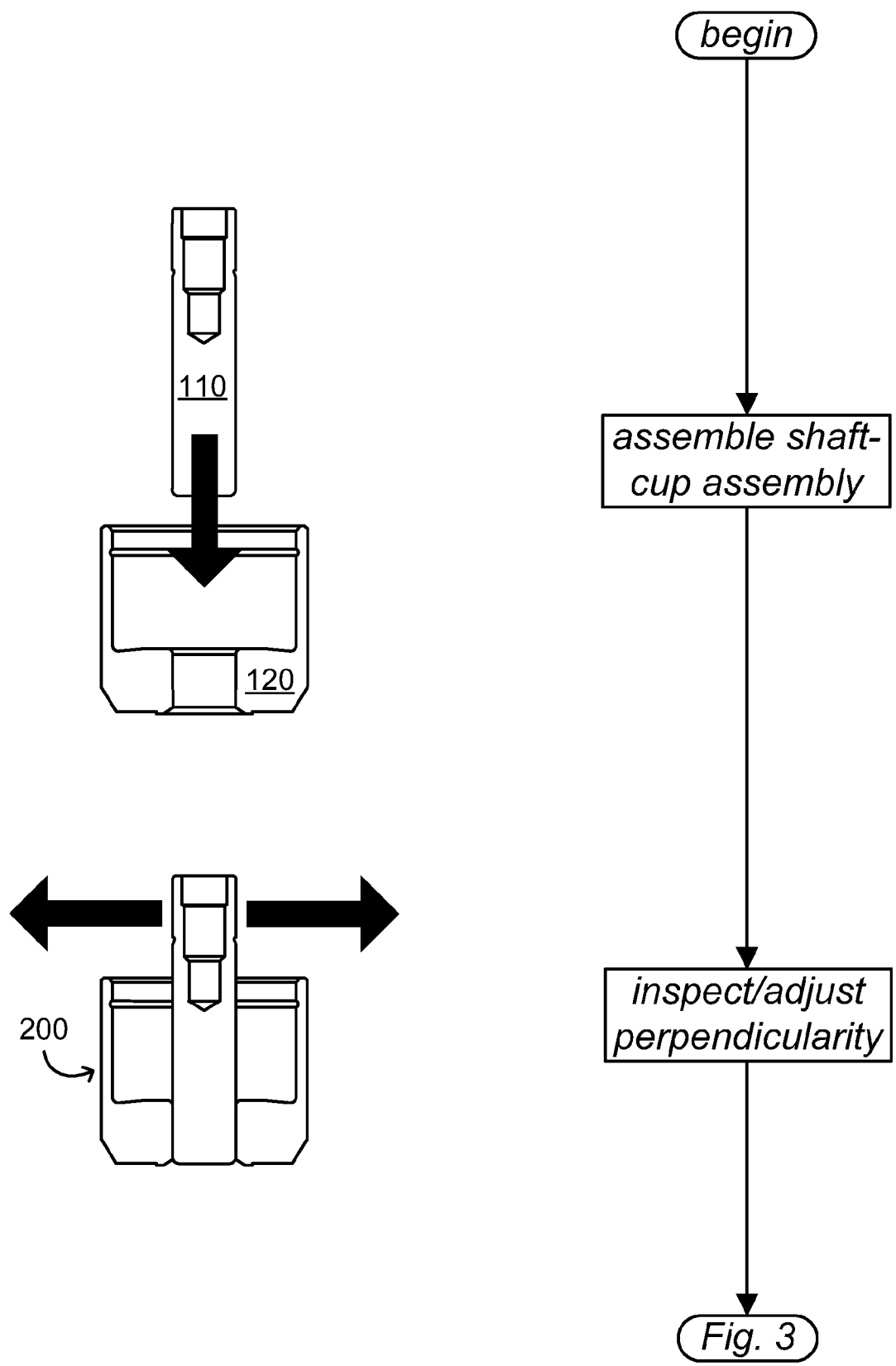

FIG. 2 provides steps of a lubricating fluid-filling method in accordance with an embodiment.

Figure 3:
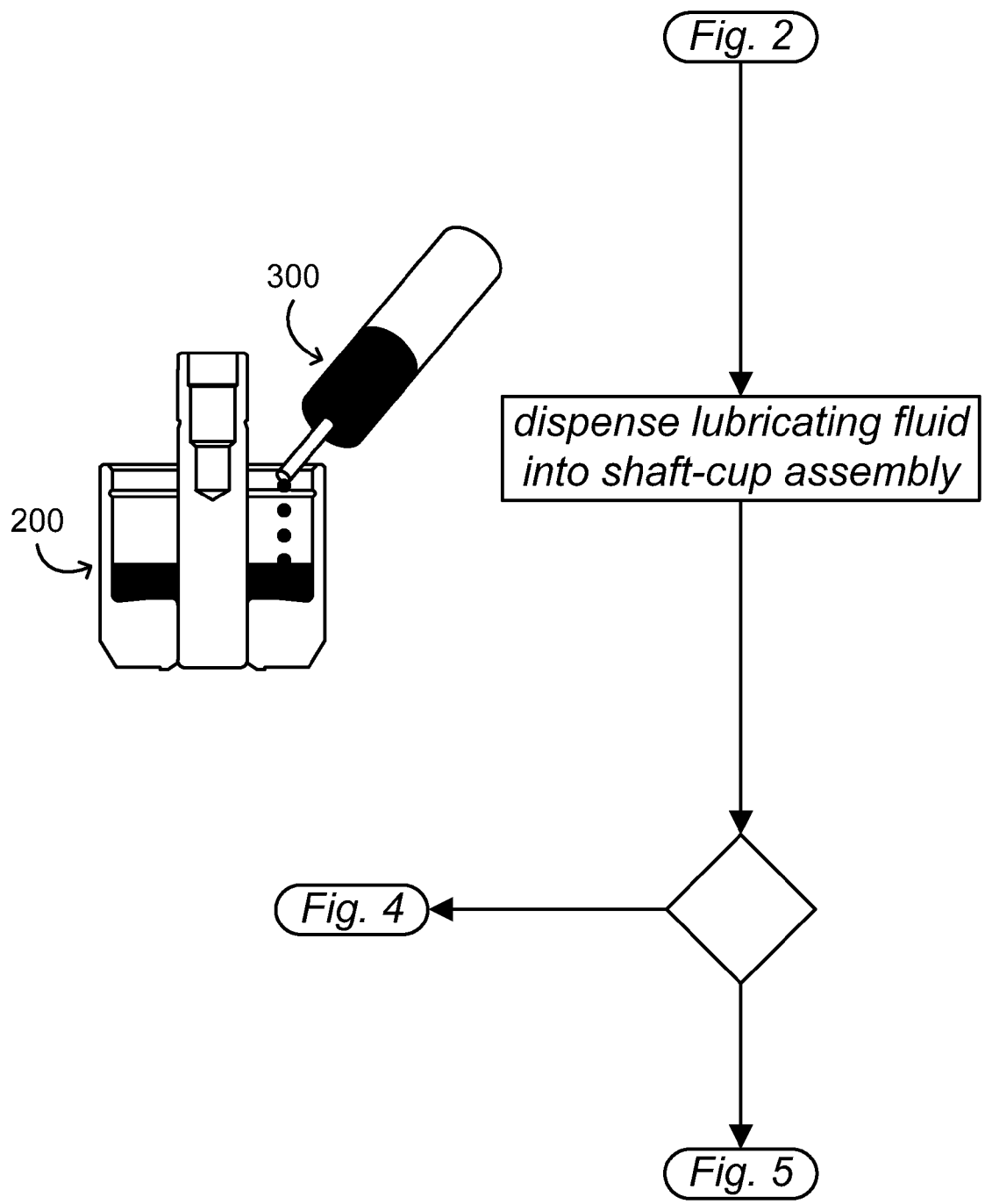

FIG. 3 provides steps of a lubricating fluid-filling method in accordance with an embodiment.

Figure 4:
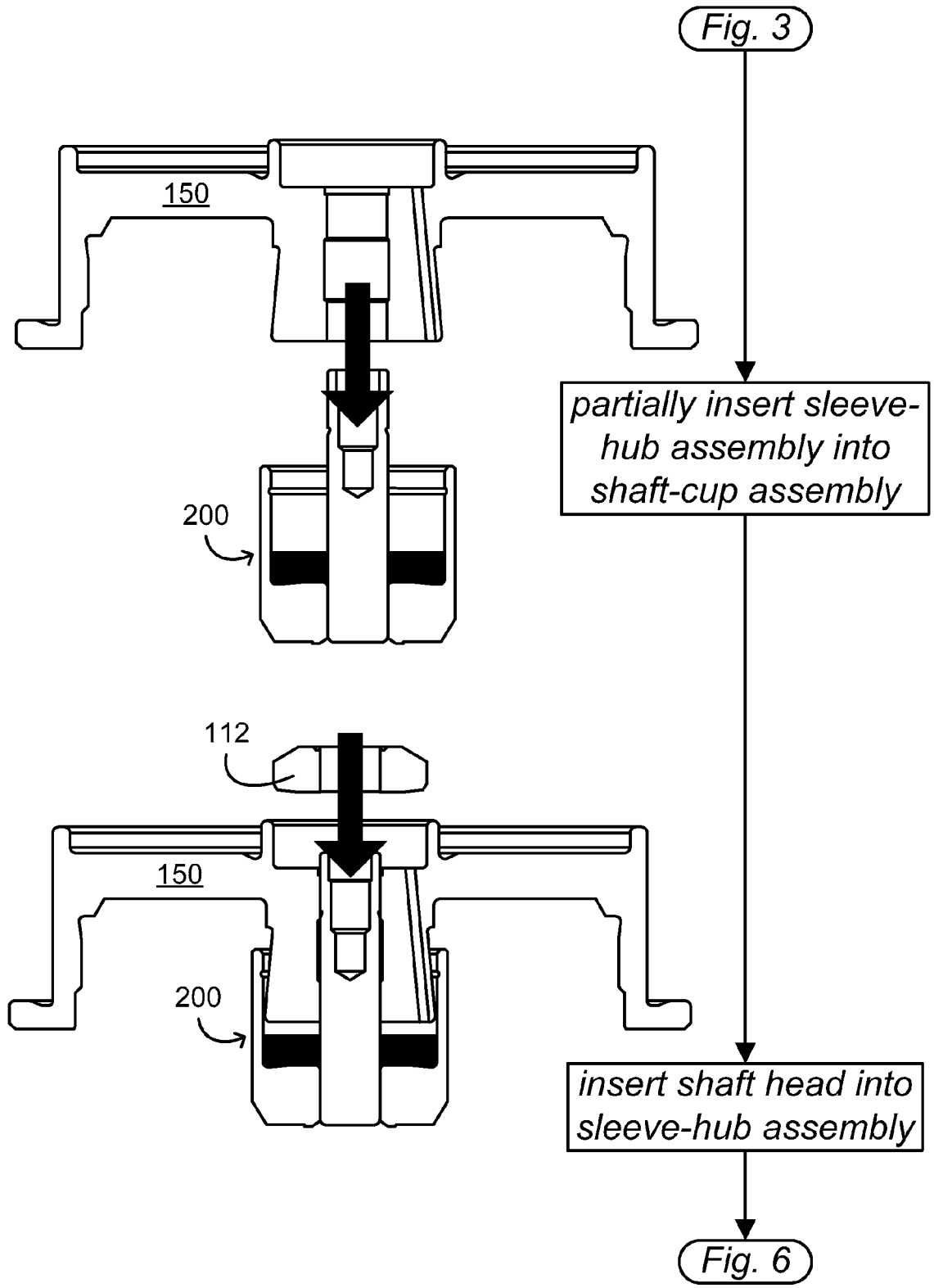

FIG. 4 provides steps of a lubricating fluid-filling method in accordance with an embodiment.

Figure 5:
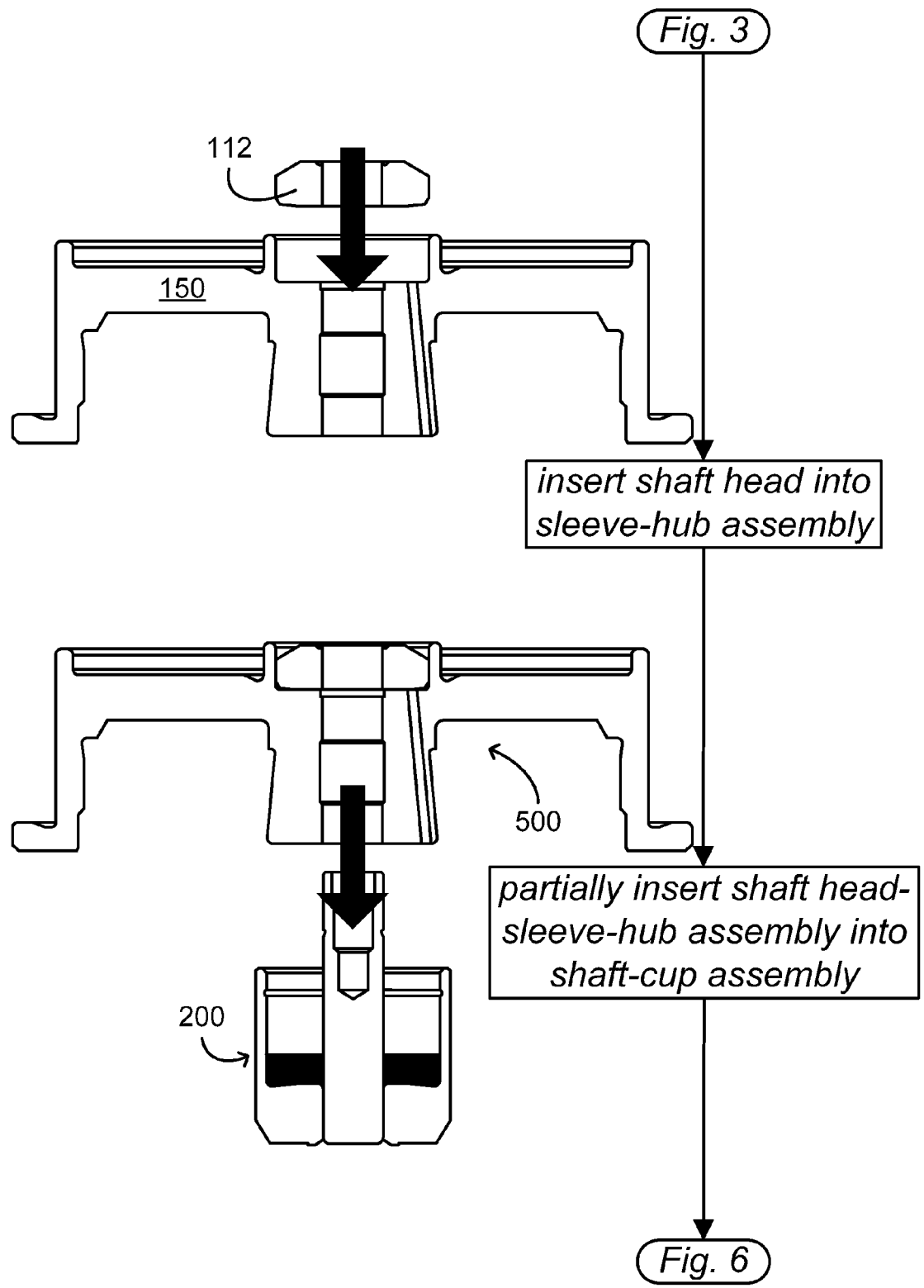

FIG. 5 provides steps of a lubricating fluid-filling method in accordance with an embodiment.

Figure 6:
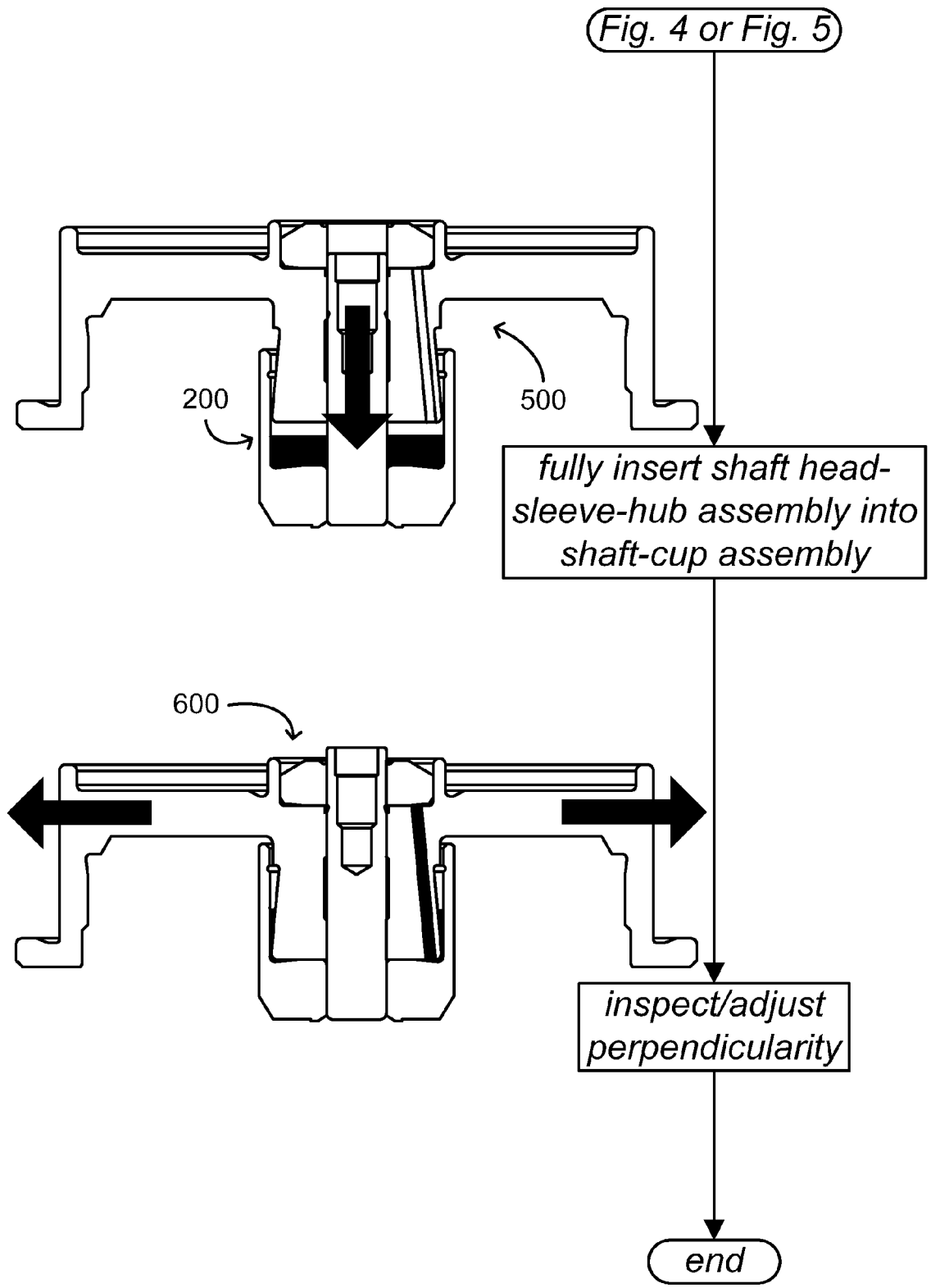

FIG. 6 provides steps of a lubricating fluid-filling method in accordance with an embodiment.

Figure 7:
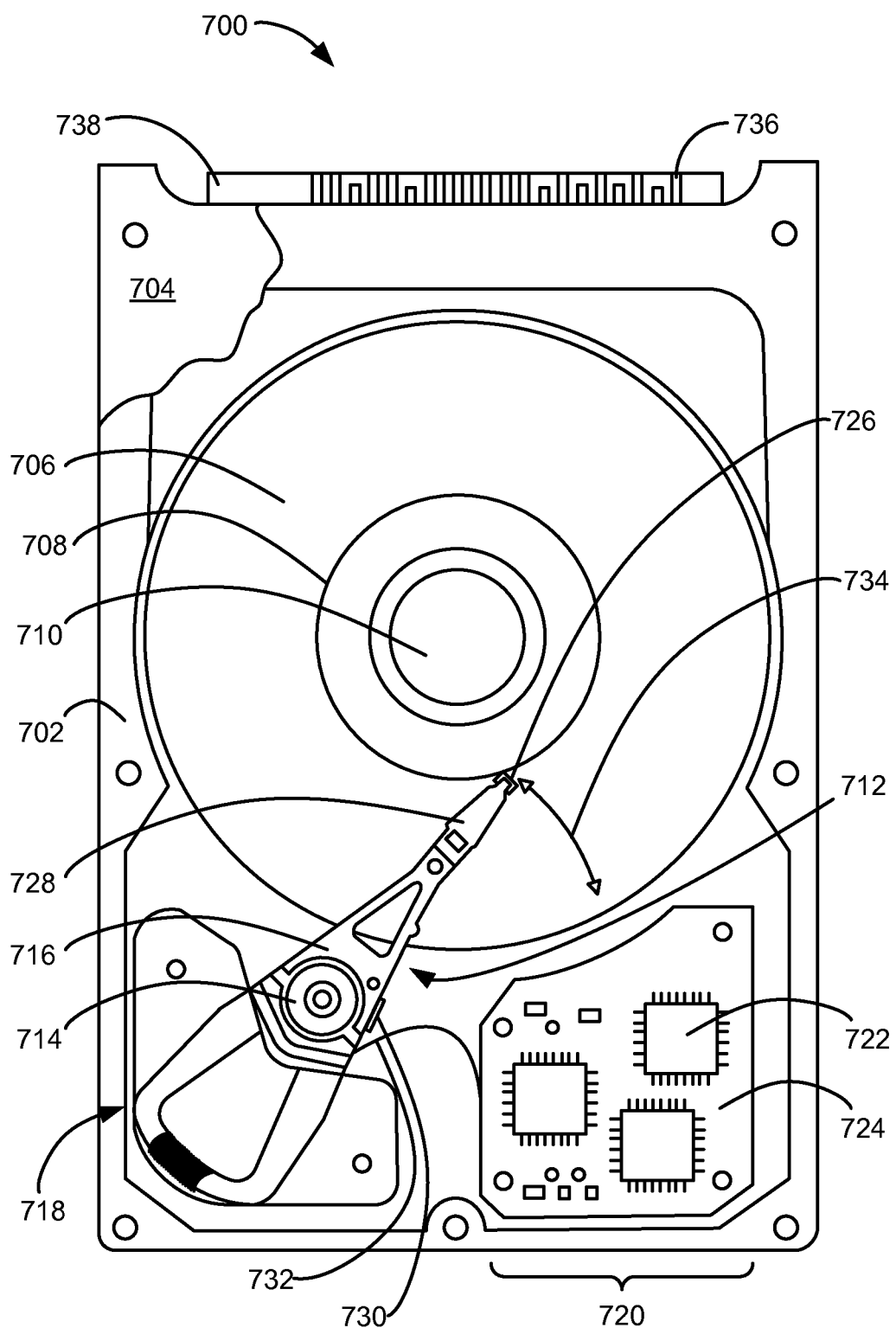

FIG. 7 provides is a plan view of a data storage device in which an FDB motor may be used, in accordance with an embodiment.

DESCRIPTION

Before some particular embodiments are illustrated and/or described in greater detail, it should be understood by persons having ordinary skill in the art that the particular embodiments provided herein do not limit the scope of the concepts provided herein, as features of such particular embodiments may vary. It should likewise be understood that a particular embodiment provided herein has features that may be readily separated from the particular embodiment and optionally combined with or substituted for features of any of a number of other embodiments illustrated and/or described herein.

It should also be understood by persons having ordinary skill in the art that the terminology used herein is for the purpose of describing the particular embodiments, and the terminology does not limit the scope of the concepts provided herein. Unless indicated otherwise, ordinal numbers (e.g., first, second, third, etc.) are used to distinguish or identify different features or steps in a group of features or steps, and do not supply a serial or numerical limitation. For example, "first," "second," and "third" features or steps need not necessarily appear in that order, and the particular embodiments need not necessarily be limited to the three features or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It should also be understood by persons having ordinary skill in the art that any two-dimensional terminology used herein for describing features of FDB motors in relation to the cross-sectional views of FDB motors provided in FIGS. 1A, 1B, and 2-6 may be extended to three-dimensional terminology. For example, a feature of an FDB motor provided in FIG. 1A, 1B, or 2-6 and described as a radial channel, which may be considered two-dimensional terminology, may be described in three-dimensional terminology as an annular channel or annular space, as the radial channel becomes an annular channel or annular space when viewed as a volume of revolution about a centerline axis of the FDB motor. In another example, a feature of an FDB motor provided in FIG. 1A, 1B, or 2-6 and described as a axial channel, which may be considered two-dimensional terminology, may be described in three-dimensional terminology as an cylindrical channel or cylindrical space, as the axial channel becomes a cylindrical channel or cylindrical space when viewed as a volume of revolution about the centerline axis of the FDB motor.

Unless defined otherwise, all technical and scientific terms used herein have the same meaning as commonly understood by persons of ordinary skill in the art.

HDDs may have exacting height constraints that limit the axial space in designs including FDB motors. The limited axial space in such designs may provide FDB motors with insufficient journal bearing span, leading to reduced angular stiffness. Larger diameter thrust bearings may increase the moment arm length component of angular stiffness, thereby increasing angular stiffness in cases where it is difficult to increase journal bearing span. However, larger diameter thrust bearings consume more power, leading to less power efficiency. Journal bearings with increased journal bearing span and typically smaller diameters than thrust bearings may increase the moment arm length component of angular stiffness, thereby increasing angular stiffness without negatively affecting power efficiency. Provided herein are lubricating fluid-filling methods and FDB motors without a need for a dedicated, axially placed, lubricating fluid-filling reservoir. As such, the lubricating fluid-filling methods and the FDB motors provided herein allow for an increased journal bearing span, thereby improving angular stiffness without significantly affecting power efficiency.

FIGS. 1A and 1B provide cross-sectional views of FDB motors that allow for the increased journal bearing span, thereby improving angular stiffness without significantly affecting power efficiency. However, it should be understood that the particular embodiments provided in FIGS. 1A and 1B are merely examples of FDB motors that allow for the increased journal bearing span, and the particular embodiments are not limiting.

The FDB motor 100 in either one of FIG. 1A or FIG. 1B includes a stationary component and a rotatable component positioned for relative rotation about a bearing system. With respect to the stationary component, the stationary component may include a shaft 110 extending from a first axial end 102 of the FDB motor 100 (see shaft head or thrust plate 112) to a second axial end 104 of the FDB motor 100, through which shaft 110 passes a centerline axis 101 of the FDB motor 100. The shaft 110 may be coupled to a cup or thrust cup 120 at the second axial end 104 of the FDB motor 100, which cup 120, in turn, may be coupled to a base 130 through a wall 122 of the cup 120. The stationary component may further include a stator assembly 140 coupled to the base 130, which stator assembly 140 may include yoke 142, a plurality of stator teeth 144, and a plurality of field coils 146 singly disposed on the plurality of stator teeth 144. Adhesive bonds may be used to couple the foregoing coupled components, but coupling may also be accomplished with an interference fit, epoxy, welds, or fasteners, as desired. One or more sub-components (e.g., shaft 110) of the stationary component may be coupled to a housing for the FDB motor 100, or a housing component (e.g., top cover 704 of FIG. 7), which may significantly improve structural stiffness of the system while compromising little in axial space.

With respect to the rotatable component of the FDB motor 100 in either one of FIG. 1A or FIG. 1B, the rotatable component may include a sleeve-hub assembly 150 having a sleeve 152 sub-component coupled to a hub 154 sub-component. As shown, the sleeve-hub assembly 150 may be an integral sleeve-hub assembly 150 having a sleeve portion 152 and a hub portion 154. The sleeve 152 of the sleeve-hub assembly 150 may be rotatably fitted within the cup 120 such that the cup wall 122 of the cup 120 extends over a substantial axial length of the sleeve 152, including over at least 20%, 30%, 40%, 50%, 60%, 70%, or 80% of the axial length of the sleeve 152, which may function to minimize angular displacement of the sleeve-hub assembly. The sleeve 152 may include a cylindrical bore through its center in which the shaft 110 may be fitted. The hub 154 of the sleeve-hub assembly 150 may include a hub flange 156 configured to support one or more disks (e.g., magnetic recording media) of a disk pack for rotation. The hub 154 may further include a back iron or magnet 148 coupled to the hub 154, which back iron 148 cooperates with the stator assembly 140 to induce rotation of the hub 154 and the disk pack. Adhesive bonds may be used to couple the foregoing coupled components, but coupling may also be accomplished with an interference fit, epoxy, welds, or fasteners, as desired.

With respect to the bearing system of the FDB motor 100 in either one of FIG. 1A or FIG. 1B, the bearing system may include a lubricating fluid (e.g., lubricating oil) and one or more FDBs selected from journal bearings and thrust bearings. As for journal bearings, the FDB motor 100 may include a journal bearing system 160 positioned in an axial channel between the shaft 110 and the sleeve 152, which axial channel may extend from a top portion of the sleeve 152 near the first axial end 102 of the FDB motor 100 to a bottom portion of the sleeve 152 near the second axial end 104 of the FDB motor 100. The journal bearing system 160 may include an upper journal bearing 162 and a lower journal bearing 164 axially separated by a radial gap (not labeled), which radial gap may function as a reservoir for some of the lubricating fluid. As shown in either one of FIG. 1A or FIG. 1B, the upper journal bearing 162 and the lower journal bearing 164 may each include pressure-generating grooves 165 (e.g., chevron-shaped grooves) for creating localized regions of pressure in the journal bearing system 160. Such pressure-generating grooves 165 may be positioned in a surface of the shaft 110 or a surface of the sleeve 152, and the upper journal bearing 162 and the lower journal bearing 164 may be the same or different with respect to the surface in which the pressure-generating grooves 165 are positioned. A person having ordinary skill in the art will recognize that pressure-generating grooves 165 are representations of pressure-generating grooves configured for creating localized regions of pressure in the journal bearing system 160.

As for thrust bearings, the bearing system of the FDB motor 100 in either one of FIG. 1A or FIG. 1B may include a thrust bearing system 170 positioned in one or more radial channels. The thrust bearing system 170 may include at least a lower thrust bearing 172 positioned in a radial channel between the sleeve 152 and the cup 120, which radial channel may extend from an inner radius of the FDB motor 100 near the shaft 110 to an outer radius of the FDB motor 100 near the wall 122 of the cup 120. The thrust bearing 172 may be further positioned in a portion of the foregoing radial channel, which portion of the radial channel may extend from an inner radius of the FDB motor 100 near the shaft 110 to an outer radius of the FDB motor 100 near a recirculation channel 182, wherein opposing surfaces (e.g., thrust surface and counter surface of thrust bearing 172) of the portion of the radial channel are parallel or about parallel. A thrust bearing system 170 including a single, lower thrust bearing 172 may be used in an FDB motor 100 including a magnetically biased hub, wherein the magnetically biased hub's attraction to the base 130 is balanced by the lift of the single, lower thrust bearing 172. The thrust bearing system 170 may further include an upper thrust bearing 174 positioned in a radial channel between the sleeve 152 and the shaft head 112, which radial channel may extend from an inner radius of the FDB motor 100 near the shaft 110 to an outer radius of the FDB motor 100 near an outer radius of the shaft head 112. The thrust bearing 174 may be further positioned in a portion of the foregoing radial channel, which portion of the radial channel may extend from an inner radius of the FDB motor 100 near the shaft 110 to an outer radius of the FDB motor 100 near a recirculation channel 182, wherein opposing surfaces (e.g., thrust surface and counter surface of thrust bearing 174) of the portion of the radial channel are parallel or about parallel. A thrust bearing system 170 including dual thrust bearings such as lower thrust bearing 172 and upper thrust bearing 174 may be used in an FDB motor 100 without a magnetically biased hub, as the downward force (e.g., toward base 130) provided by the upper thrust bearing 174 is balanced by the lift provided by lower thrust bearing 172. As shown in either one of FIG. 1A or FIG. 1B, the lower thrust bearing 172 and the upper thrust bearing 174 (if present, as in FIG. 2A) may each include pressure-generating grooves 175 (e.g., chevron-shaped grooves; spiral-shaped grooves; etc.) for creating localized regions of pressure in the thrust bearing system 170. Such pressure-generating grooves 175 may be positioned in a surface of the sleeve 152 or in an opposing surface such as an opposing surface of the cup 120 or an opposing surface of the shaft head 112. The lower thrust bearing 172 and the upper thrust bearing 174 may be the same or different with respect to the surface in which the pressure-generating grooves are positioned. A person having ordinary skill in the art will recognize that pressure-generating grooves 175 are representations of pressure-generating grooves configured for creating localized regions of pressure in the thrust bearing system 170.

The FDB motor 100 in either one of FIG. 1A or FIG. 1B further includes a recirculation system 180 for the lubricating fluid, wherein the recirculation system 180 is primarily positioned between the stationary component and the rotatable component, and wherein the recirculation system 180 includes the bearing system (e.g., journal bearing system 160 and thrust bearing system 170) and a fluid circuit. The fluid circuit includes a recirculation channel 182 and the channels in which the bearing system is positioned, including the axial channel in which the journal bearing system 160 positioned and the radial channels in which the thrust bearing system 170 is positioned. Flow through the fluid circuit is denoted in FIGS. 1A and 1B by a clockwise-oriented group of arrows. The recirculation channel 182 of the fluid circuit may be formed within the rotatable component such as through the sleeve 152 in a number of different configurations, including the configurations shown in each of FIGS. 1A and 1B. As shown in FIG. 1A, the recirculation channel 182 may be configured such that the recirculation channel 182 is parallel to the shaft 110 and/or centerline axis 101. In such a configuration, the recirculation channel 182 near the first axial end 102 of the FDB motor 100 and the recirculation channel 182 near the second axial end 104 of the FDB motor 100 are at equal radial distances from the shaft 110 and/or centerline axis 101. As shown in FIG. 1B, the recirculation channel 182 may be configured such that the recirculation channel 182 is angled or not parallel to the shaft 110 and/or centerline axis 101. In such a configuration, the recirculation channel 182 near the first axial end 102 of the FDB motor 100 may be at an inner radius and the recirculation channel 182 near the second axial end 104 of the FDB motor 100 may be at an outer radius, wherein the inner radius and the outer radius represent relative radial distances from the shaft 110 and/or centerline axis 101.

The FDB motor 100 in either one of FIG. 1A or FIG. 1B further includes a sealing system 190 positioned outside the fluid circuit (e.g., radially outward from the fluid circuit) of the recirculation system 180 for sealing the lubricating fluid within the FDB motor 100, which includes containing the lubricating fluid within the recirculation system and/or maintaining lubricating fluid in the bearing system (e.g., journal bearing system 160 and thrust bearing system 170), such as maintaining lubricating fluid at the interfaces of the journal bearings and the thrust bearing(s). The sealing system 190 may include a lower capillary seal 192 and an upper capillary seal 194 (optionally a grooved pump seal 194 in some embodiments), which lower capillary seal 192 and upper capillary seal 194 work in concert to seal the lubricating fluid within the FDB motor 100, and which lower capillary seal 192 and upper capillary seal 194 are in equilibrium during relative rotation of the stationary component and the rotatable component or at rest. Each of the lower capillary seal 192 and the upper capillary seal 194 includes a meniscus defining an air-lubricating fluid interface (e.g. air-oil interface), wherein the meniscus 193 corresponds to the meniscus of the lower capillary seal 192, and wherein the meniscus 195 corresponds to the meniscus of the upper capillary seal 194. The meniscus 193 of the lower capillary seal 192 and the meniscus 195 of the upper capillary seal 194 balance out when the FDB motor 100 is at rest or during relative rotation of the stationary component and the rotatable component, such that the surface tension and/or the surface curvature of the meniscus 193 of the lower capillary seal 192 and the meniscus 195 of the upper capillary seal 194 match or nearly match. As illustrated in either one of FIG. 1A or 1B, the sealing system 190 may further include an end cap 198 to further seal the lubricating fluid within the FDB motor 100. The end cap 198 may function as secondary containment for the lubricating fluid, and/or the end cap 198 may function as a barrier to keep the lubricating fluid free from outside debris.

With respect to the lower capillary seal 192 and the upper capillary seal 194 of the FDB motor 100, each may be configured to provide a low stiffness seal, a low pressure seal, and/or a high volume seal relative to, for example, a grooved pump seal. As provided in either one of FIG. 1A or FIG. 1B, the lower capillary seal 192 may be positioned in an axial channel between the sleeve 152 and the wall 122 of the cup 120, which axial channel extends from a bottom of the rotatable component near the second axial end 104 of the FDB motor 100 and opens toward the first axial end 102 of the FDB motor 100. As illustrated in either one of FIG. 1A or 1B, the axial channel in which the lower capillary seal 192 is positioned includes a diverging gap. The diverging gap in which the lower capillary seal 192 is positioned may be configured to draw lubricating fluid into the gap by capillary action toward the second axial end 104 of the FDB motor 100 where the diverging gap is tighter. As provided in either one of FIG. 1A or FIG. 1B, the upper capillary seal 194 may be positioned in a radial channel between the sleeve 152 and the shaft head 112, which radial channel extends outward from the shaft 110 and/or centerline axis 101 of the FDB motor 100. As illustrated in either one of FIG. 1A or 1B, the radial channel in which the upper capillary seal 194 is positioned includes a diverging gap. The diverging gap in which the upper capillary seal 194 is positioned may be configured to draw lubricating fluid into the gap by capillary action toward the shaft 110 and/or centerline axis 101 of the FDB motor 100 where the diverging gap is tighter. The axially diverging gap in which the lower capillary seal 192 is positioned and/or the radially diverging gap in which the upper capillary seal 194 is positioned may be further configured to purge air bubbles entrained in the lubricating fluid.

FIGS. 2-6 provide lubricating fluid-filling methods that also allow for the increased journal bearing span, thereby improving angular stiffness without significantly affecting power efficiency. However, it should be understood that the particular embodiments provided in FIGS. 2-6 are merely examples of lubricating fluid-filling methods that allow for the increased journal bearing span, and the particular embodiments are not limiting.

FIG. 2 provides steps for assembling a shaft-cup assembly 200 in accordance with lubricating fluid-filling methods provided herein. As illustrated in FIG. 2, the shaft-cup assembly 200 comprising the shaft 110 and the cup 120 of the FDB motor 100 in either one of FIG. 1A or 1B may be assembled by inserting a bottom portion of the shaft 110 into a cylindrical bore through a center of a bottom of the cup 120. Subsequent to inserting the shaft 110 into the cup 120, the perpendicularity of the shaft 110 with respect to the bottom of the cup 120 may be inspected and/or adjusted. Adhesive bonds may be used to couple the shaft 110 to the cup 120 of the shaft-cup assembly 200, but coupling may also be accomplished with an interference fit, epoxy, welds, or fasteners, as desired.

FIG. 3 provides steps for dispensing lubricating fluid into the cup 120 of the shaft-cup assembly 200 of FIG. 2 in accordance with lubricating fluid-filling methods provided herein. As illustrated in FIG. 3, the cup 120 of the shaft-cup assembly 200 may have a volume that allows for it to be filled with a predetermined volume or a predetermined amount (e.g., moles or mass) of the lubricating fluid during assembly of the FDB motor 100. The volume of the cup 120 of the shaft-cup assembly 200 may range from greater than the predetermined volume or the predetermined amount of the lubricating fluid intended for use in the FDB motor 100 to a volume substantially equal to the predetermined volume or the predetermined amount of the lubricating fluid intended for use in the FDB motor 100. In some embodiments, for example, the volume of the cup 120 of the shaft-cup assembly 200 may be greater than the predetermined volume or the predetermined amount of the lubricating fluid intended for use in the FDB motor 100, a portion of which volume of the cup 120 of the shaft-cup assembly 200 may be reserved for receiving the predetermined volume or the predetermined amount of the lubricating fluid.

As further illustrated in FIG. 3, the cup 120 of the shaft-cup assembly 200 or a portion thereof (e.g., volume reserved for the lubricating fluid) may be filled with the predetermined volume or the predetermined amount of the lubricating fluid using a dispenser 300. The lubricating fluid may be dispensed from the dispenser 300 under ambient (e.g., standard ambient temperature and pressure) conditions or under sub-ambient (e.g., standard temperature and below standard pressure; below standard temperature and below standard pressure; etc.) conditions. Under ambient conditions, the lubricating fluid may be dispensed through, for example, a high-precision, pneumatically controlled syringe. Under sub-ambient conditions (e.g., at least partial vacuum), the lubricating fluid may be dispensed through, for example, a microdispenser such as a MicroDrop® microdispenser, which may provide droplets of the lubricating fluid ranging from 30 μm to 100 μm in size. The MicroDrop® microdispenser may further provide droplets of the lubricating fluid at a velocity of 1.5 m/s to 3 m/s, or more, allowing the lubricating fluid to be dispensed from a distance, rather than inserting, for example, a syringe needle into the cup 120 of the shaft-cup assembly 200.

FIG. 4 provides steps for partially inserting the sleeve-hub assembly 150 into the shaft-cup assembly 200 having a lubricating fluid-filled cup 120 in accordance with lubricating fluid-filling methods provided herein. As illustrated in FIG. 4, the sleeve-hub assembly 150, which may be an integral sleeve-hub assembly 150 as provided herein, may be partially inserted into the shaft-cup assembly 200 having the predetermined volume or the predetermined amount of the lubricating fluid in the cup 120 such that the sleeve-hub assembly 150 is in a position wholly or substantially above the predetermined volume or the predetermined amount of the lubricating fluid in the cup 120. Subsequent to partially inserting the sleeve-hub assembly 150 into the shaft-cup assembly 200, the shaft head 112 may be inserted into the top portion of the sleeve 152 of the sleeve-hub assembly 150. In some embodiments, as illustrated in FIG. 4 for example, the shaft 110 of the shaft-cup assembly 200 may protrude through the top portion of the sleeve 152 of the sleeve-hub assembly 150. In such embodiments, the shaft 110 may be used to guide the shaft head 112 into the top portion of the sleeve 152 of the sleeve-hub assembly 150. In such embodiments, a partial interference fit between the shaft head 112 and the shaft 110 may stabilize the assembly comprising the shaft head 112 and sleeve-hub assembly 150 partially inserted into the shaft-cup assembly 200.

FIG. 5 provides alternative steps to FIG. 4 for partially inserting the sleeve-hub assembly 150 into the shaft-cup assembly 200 having a lubricating fluid-filled cup 120 in accordance with lubricating fluid-filling methods provided herein. As illustrated in FIG. 4, the shaft head 112 may be inserted into the top portion of the sleeve 152 of the sleeve-hub assembly 150 providing a shaft head-sleeve-hub assembly 500. Subsequent to inserting the shaft head 112 into the top portion of the sleeve 152 of the sleeve-hub assembly 150, the shaft head-sleeve-hub assembly 500 may be partially inserted into the shaft-cup assembly 200 having the predetermined volume or the predetermined amount of the lubricating fluid in the cup 120 such that the shaft head-sleeve-hub assembly 500 is in a position wholly or substantially above the predetermined volume or the predetermined amount of the lubricating fluid in the cup 120. In some embodiments, the cylindrical bore through the center of sleeve 152 of the sleeve-hub assembly 150 may be used to guide the shaft 110 into the shaft head 112 in the top portion of the sleeve 152 of the sleeve-hub assembly 150. In some embodiments, a partial interference fit between the shaft head 112 and the shaft 110 may stabilize the assembly comprising the shaft head-sleeve-hub assembly 500 partially inserted into the shaft-cup assembly 200.

Referring to FIGS. 4 and 5, when the sleeve-hub assembly 150 or the shaft head-sleeve-hub assembly 500 is in the position wholly above the predetermined volume or the predetermined amount of the lubricating fluid in the cup 120, the bottom portion (e.g., bottom surface) of the sleeve 152 is not beneath a surface of the bulk lubricating fluid in the cup 120 or in contact with the surface of the bulk lubricating fluid in the cup 120. In addition, the bottom portion of the sleeve 152, including any other portion (e.g., surface) of the sleeve-hub assembly 150 or the shaft head-sleeve-hub assembly 500 thereof, is also not in contact with any lubricating fluid that is not part of the bulk lubricating fluid in the cup 120, such as droplets present on the shaft 110 or the cup wall 122. When the sleeve-hub assembly 150 or the shaft head-sleeve-hub assembly 500 is in the position substantially above the predetermined volume or the predetermined amount of the lubricating fluid in the cup 120, the bottom portion (e.g., bottom surface) of the sleeve 152 is not beneath the surface of the bulk lubricating fluid in the cup 120 or in contact with the surface of the bulk lubricating fluid in the cup 120; however, lubricating fluid not part of the bulk lubricating fluid in the cup 120, such as droplets present on the shaft 110 or the cup wall 122, may be in contact with the bottom portion of the sleeve 152, including any other portion (e.g., surface) of the sleeve-hub assembly 150 or the shaft head-sleeve-hub assembly 500 thereof.

FIG. 6 provides steps for fully inserting the partially inserted shaft head-sleeve-hub assembly 500 into the shaft-cup assembly 200 having a lubricating fluid-filled cup 120 in accordance with lubricating fluid-filling methods provided herein. As illustrated in FIG. 6, the partially inserted shaft head-sleeve-hub assembly 500 may be fully inserted into the shaft-cup assembly 200 having a lubricating fluid-filled cup 120. While the shaft head-sleeve-hub assembly 500 is fully inserted into the shaft-cup assembly 200, the lubricating fluid in the cup 120 is displaced by the sleeve 152, and, by capillary action, the lubricating fluid is worked into the bearing system (e.g., journal bearing system 160 and thrust bearing system 170) and the fluid circuit, which fluid circuit includes the recirculation channel 182 and the channels in which the bearing system is positioned. Subsequent to fully inserting the shaft head-sleeve-hub assembly 500 into the shaft-cup assembly 200, which provides a composite assembly 600 comprising a rotatable component (e.g., the shaft head-sleeve-hub assembly 500) in a stationary component (e.g., the shaft-cup assembly 200), the perpendicularity of the shaft head-sleeve-hub assembly 500 with respect to the bottom of the cup 120 of the shaft-cup assembly 200 may be inspected and/or adjusted.

FIG. 7 is a plan view of a data storage device in which the FDB motor 100 described herein may be used. A disk drive 700 generally includes a base plate 702 and a cover 704 that may be disposed on the base plate 702 to define an enclosed housing for various disk drive components. The disk drive 700 includes one or more data storage disks 706 of magnetic recording media. Typically, both of the major surfaces of each data storage disk 706 include a plurality of concentrically disposed tracks for data storage purposes. Each data storage disk 706 is mounted on a hub 708 (e.g., hub flange 156 of hub 154 of the FDB motor 100 of FIGS. 1A and 1B), which, in turn, is rotatably interconnected with the base plate 702 and/or cover 704. Multiple data storage disks 706 are typically mounted in vertically spaced and parallel relation on the hub 708. A spindle motor 710 (e.g., the FDB motor 100 of FIGS. 1A and 1B) rotates the data storage disks 706.

The disk drive 700 also includes an actuator arm assembly 712 that pivots about a pivot bearing 714, which, in turn, is rotatably supported by the base plate 702 and/or cover 704. The actuator arm assembly 712 includes one or more individual rigid actuator arms 716 that extend out from near the pivot bearing 714. Multiple actuator arms 716 are typically disposed in vertically spaced relation, with one actuator arm 716 being provided for each major data storage surface of each data storage disk 706 of the disk drive 700. Other types of actuator arm assembly configurations could be utilized as well, an example being an "E" block having one or more rigid actuator arm tips, or the like, that cantilever from a common structure. Movement of the actuator arm assembly 712 is provided by an actuator arm drive assembly, such as a voice coil motor 718 or the like. The voice coil motor 718 is a magnetic assembly that controls the operation of the actuator arm assembly 712 under the direction of control electronics 720.

The control electronics 720 may include a plurality of integrated circuits 722 coupled to a printed circuit board 724. The control electronics 720 may be coupled to the voice coil motor assembly 718, a slider 726, or the spindle motor 710 using interconnects that can include pins, cables, or wires (not shown).

A load beam or suspension 728 is attached to the free end of each actuator arm 716 and cantilevers therefrom. Typically, the suspension 728 is biased generally toward its corresponding data storage disk 706 by a spring-like force. The slider 726 is disposed at or near the free end of each suspension 728. What is commonly referred to as the read-write head (e.g., transducer) is appropriately mounted as a head unit (not shown) under the slider 726 and is used in disk drive read/write operations. The head unit under the slider 726 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 726 is connected to a preamplifier 730, which is interconnected with the control electronics 720 of the disk drive 700 by a flex cable 732 that is typically mounted on the actuator arm assembly 712. Signals are exchanged between the head unit and its corresponding data storage disk 706 for disk drive read-write operations. In this regard, the voice coil motor 718 is utilized to pivot the actuator arm assembly 712 to simultaneously move the slider 726 along a path 734 and across the corresponding data storage disk 706 to position the head unit at the appropriate position on the data storage disk 706 for disk drive read/write operations.

In accordance with some disk drive designs, when the disk drive 700 is not in operation, the actuator arm assembly 712 may be pivoted to a "parked position" to dispose each slider 726 generally at or beyond a perimeter of its corresponding data storage disk 706, but in any case in vertically spaced relation to its corresponding data storage disk 706. In this regard, the disk drive 700 includes a ramp assembly (not shown) that is disposed beyond a perimeter of the data storage disk 706 to both move the corresponding slider 726 vertically away from its corresponding data storage disk 706 and to also exert somewhat of a retaining force on the actuator arm assembly 712.

Exposed contacts 736 of a drive connector 738 along a side end of the disk drive 700 may be used to provide connectivity between circuitry of the disk drive 700 and a next level of integration such as an interposer, a circuit board, a cable connector, or an electronic assembly. The drive connector 738 may include jumpers (not shown) or switches (not shown) that may be used to configure the disk drive 700 for user specific features or configurations. The jumpers or switches may be recessed and exposed from within the drive connector 738.

An FDB motor is typically filled with lubricating fluid after assembly of the FDB motor, wherein the lubricating fluid intended for use in the FDB motor is dropped or injected under sub-ambient conditions into a lubricating fluid-filling space at the top of the motor such as a dedicated, axially placed, lubricating fluid-filling reservoir. The lubricating fluid is then allowed to work into the FDB motor by capillary action. However, any lubricating fluid inadvertently dropped or splashed onto the FDB motor (e.g., shaft, hub, etc.) during the filling must be cleaned off. In addition, the lubricating fluid-filling space at the top of the FDB motor must be large enough to hold the lubricating fluid, which typically requires axial space that could otherwise be used for a larger journal bearing span and, thereby, greater angular stiffness. Making smaller the lubricating fluid-filling space at the top of the FDB motor to accommodate a larger journal bearing span increases the probability for lubricating fluid to be inadvertently dropped or splashed onto the FDB motor. Lubricating fluid-filling methods and FDB motors provided herein circumvent the foregoing.

Lubricating fluid-filling methods and FDB motors without a need for a dedicated, axially placed, lubricating fluid-filling reservoir provide axial space into which a journal bearing system may be expanded. An increase in bearing span for any one or more journal bearings in the journal bearing system provides an increase in angular stiffness for the FDB motor as angular stiffness is the mathematical product of linear stiffness (i.e., radial stiffness in the journal bearing(s) and axial stiffness in the thrust bearing(s)) and moment arm length (i.e., journal bearing span and thrust bearing diameter). Because angular stiffness of the FDB motor may be increased with the increase in bearing span for any one or more journal bearings of the journal bearing system, one or more larger diameter thrust bearings are not needed for the increase in angular stiffness for the FDB motor, which one or more larger diameter thrust bearings are known to decrease power efficiency of the FDB motor. As such, lubricating fluid-filling methods and FDB motors provided herein provide a means for increasing angular stiffness of the FDB motor without decreasing the power efficiency of the FDB motor. It should be understood that it may be desirable in some FDB motors (e.g., FDB motors in HDDs having small form factors) to further increase angular stiffness using one or more larger diameter thrust bearings, wherein the further increase in angular stiffness may be in addition to increasing the bearing span for one or more journal bearings. While the further increase in angular stiffness using one or more larger diameter thrust bearings may decrease the power efficiency of the FDB motor, the decrease in power efficiency may be less than that for the same gain in angular stiffness using one or more larger diameter thrust bearings alone.

As such, provided herein is an apparatus, comprising a stationary component comprising a cup containing a predetermined amount of lubricating fluid; a rotatable component comprising a sleeve, wherein the rotatable component is fitted within the stationary component in a position substantially above the predetermined amount of lubricating fluid; and an annular member configured for forming a thrust bearing with the sleeve. In some embodiments, a top surface of the sleeve and an opposing surface of the annular member are configured for forming the thrust bearing. In some embodiments, the cup is configured for forming an additional thrust bearing with the sleeve. In some embodiments, a bottom surface of the sleeve and an opposing surface of the cup are configured for forming the additional thrust bearing. In some embodiments, the stationary component further comprises a shaft in a shaft-cup assembly adjusted for perpendicularity. In some embodiments, an inner surface of the sleeve and an opposing surface of the shaft are configured for forming a journal bearing.

Also provided herein is an apparatus, comprising a stationary component comprising a cup having a volume reserved for receiving a predetermined amount of lubricating fluid; a rotatable component comprising a sleeve, wherein the rotatable component is fitted within the stationary component in a position substantially above the volume; and an annular member configured for forming a thrust bearing with the sleeve. In some embodiments, a top surface of the sleeve and an opposing surface of the annular member are configured for forming the thrust bearing. In some embodiments, the cup is configured for forming an additional thrust bearing with the sleeve. In some embodiments, a bottom surface of the sleeve and an opposing surface of the cup are configured for forming the additional thrust bearing. In some embodiments, the stationary component further comprises a shaft in a shaft-cup assembly adjusted for perpendicularity. In some embodiments, an inner surface of the sleeve and an opposing surface of the shaft are configured for forming a journal bearing.

Also provided herein is a method, comprising dispensing lubricating fluid into a cup of a stationary component; inserting a rotatable component into a first position above the lubricating fluid in the cup, forming a partial composite assembly; and fitting an annular member to the partial composite assembly and further inserting the rotatable component into a second position in the cup, forming a composite assembly. In some embodiments, the rotatable component is separated from a bulk of the lubricating fluid in the first position, and the composite assembly is lubricated with the bulk of the lubricating fluid by capillary action after further inserting the rotatable component into the second position. In some embodiments, the composite assembly is adjusted for perpendicularity after forming the composite assembly. In some embodiments, the stationary component comprises a shaft in a shaft-cup assembly, and the rotatable component comprises a sleeve. In some embodiments, the shaft-cup assembly is adjusted for perpendicularity before dispensing lubricating fluid into the cup. In some embodiments, a bottom surface of the sleeve and an opposing surface of the cup form a thrust bearing in the composite assembly. In some embodiments, a top surface of the sleeve and an opposing surface of the annular member form a thrust bearing in the composite assembly. In some embodiments, an inner surface of the sleeve and an opposing surface of the shaft form a journal bearing in the composite assembly.

While some particular embodiments have been illustrated and/or described herein, and while the particular embodiments have been illustrated and/or described in some detail, the particular embodiments are not intended to limit the scope of the concepts provided herein. Additional adaptations and/or modifications may readily appear to persons having ordinary skill in the art, and, in broader aspects, these adaptations and/or modifications may be encompassed as well. Accordingly, departures may be made from the particular embodiments illustrated and/or described herein without departing from the scope of the concepts provided herein. The implementations provided herein and other implementations are within the scope of the following claims.

What is claimed is:

1. A method, comprising
dispensing lubricating fluid into a cup of a stationary component, wherein
the stationary component includes the cup and a shaft,
the rotatable component includes a sleeve, and
the sleeve is rotatable with respect to the shaft;
inserting a rotatable component into a first position above the lubricating fluid in the cup, forming a partial composite assembly;
fitting an annular member to the partial composite assembly; and
further inserting the rotatable component into a second position in the cup, forming a composite assembly of a hard disk drive, wherein a bottom surface of the sleeve and an opposing surface of the cup form a thrust bearing.

2. The method of claim 1, wherein the rotatable component is separated from a bulk of the lubricating fluid in the first position, and wherein the composite assembly is lubricated with the bulk of the lubricating fluid by capillary action after further inserting the rotatable component into the second position.

3. The method of claim 1, wherein the composite assembly is adjusted for perpendicularity after forming the composite assembly.

4. The method of claim 1, wherein the shaft and the cup are adjusted for perpendicularity before dispensing lubricating fluid into the cup.

5. The method of claim 1, wherein a top surface of the sleeve and an opposing surface of the annular member form a thrust bearing in the composite assembly.

6. The method of claim 1, wherein an inner surface of the sleeve and an opposing surface of the shaft form a journal bearing in the composite assembly.

7. A method, comprising
dispensing lubricating fluid into a cup, wherein the cup is at a second axial end of a stationary component, wherein the stationary component includes a shaft and the cup;
inserting a rotatable component into a first position above the lubricating fluid in the cup, forming a partial composite assembly, wherein the rotatable component includes a sleeve and the rotatable component is rotatable with respect to the stationary component;

fitting an annular member to the partial composite assembly, wherein the annular member is a thrust plate at a first axial end of the stationary component; and further inserting the rotatable component into a second position in the cup, forming a composite assembly of a hard disk drive, wherein a bottom surface of the sleeve and an opposing surface of the cup form a thrust bearing in the composite assembly.

8. The method of claim 7, wherein the rotatable component is separated from a bulk of the lubricating fluid in the first position, and wherein the composite assembly is lubricated with the bulk of the lubricating fluid by capillary action after further inserting the rotatable component into the second position.

9. The method of claim 7, wherein the composite assembly is adjusted for perpendicularity after forming the composite assembly.

10. The method of claim 7, wherein the shaft and the cup are adjusted for perpendicularity before dispensing lubricating fluid into the cup.

11. The method of claim 7, wherein a top surface of the sleeve and an opposing surface of the annular member form a thrust bearing in the composite assembly.

12. The method of claim 7, wherein an inner surface of the sleeve and an opposing surface of the shaft form a journal bearing in the composite assembly.

13. A method, comprising
dispensing lubricating fluid into a cup of a stationary component, wherein the stationary component includes a shaft and the cup;

inserting a rotatable component into a first position above the lubricating fluid in the cup, forming a partial composite assembly, wherein the rotatable component includes a sleeve and the rotatable component is rotatable with respect to the stationary component;

fitting an annular member to the partial composite assembly; and further inserting the rotatable component into a second position in the cup, forming a composite assembly of a hard disk drive, wherein
the rotatable component and the cup form a lower thrust bearing, and
the annular member and the rotatable component form an upper thrust bearing.

14. The method of claim 13, wherein the rotatable component is separated from a bulk of the lubricating fluid in the first position, and wherein the composite assembly is lubricated with the bulk of the lubricating fluid by capillary action after further inserting the rotatable component into the second position.

15. The method of claim 13, wherein the composite assembly is adjusted for perpendicularity after forming the composite assembly.

* * * * *